(12) United States Patent
Chen (10) Patent No.: US 11,746,944 B2
(45) Date of Patent: Sep. 5, 2023

(54) PISTON-TYPE WATER HAMMER ABSORBER

(71) Applicant: NINGBO YONGONG UNITED IMP&EXP CO., LTD, Ningbo (CN)

(72) Inventor: Daowei Chen, Ningbo (CN)

(73) Assignee: NINGBO YONGONG UNITED IMP & EXP CO., LTD, Ningbo (CN)

( * ) Notice: Subject to any disclaimer, the term of this patent is extended or adjusted under 35 U.S.C. 154(b) by 0 days.

(21) Appl. No.: 17/656,717

(22) Filed: Mar. 28, 2022

(65) Prior Publication Data
US 2023/0228358 A1    Jul. 20, 2023

(30) Foreign Application Priority Data

Jan. 14, 2022   (CN) .......................... 202220093565.9

(51) Int. Cl.
*F16L 55/053*    (2006.01)

(52) U.S. Cl.
CPC .................................. *F16L 55/053* (2013.01)

(58) Field of Classification Search
CPC ................. F15B 1/24; F15B 2201/205; F15B 2201/312; F15B 2201/31; F15B 2201/4155; F15B 2201/45; F15B 2201/4053; F15B 2201/415; F16L 55/04
USPC .............................................. 138/26, 31, 30
See application file for complete search history.

(56) References Cited

U.S. PATENT DOCUMENTS

| | | | | |
|---|---|---|---|---|
| 2,715,419 A * | 8/1955 | Ford | ..................... | F16L 55/052 138/31 |
| 2,780,504 A * | 2/1957 | Russell | ..................... | F15B 1/24 92/155 |
| 2,804,094 A * | 8/1957 | Gratzmuller | ............. | F15B 1/24 138/31 |
| 3,004,561 A * | 10/1961 | Henry | ....................... | F15B 1/24 138/31 |
| 3,136,340 A * | 6/1964 | Wildi | ........................ | F15B 1/24 138/31 |
| 3,613,734 A * | 10/1971 | Elmer | ....................... | F15B 1/24 138/31 |
| 3,863,677 A * | 2/1975 | Tarsha | ..................... | F16J 10/04 138/31 |
| 4,819,698 A * | 4/1989 | Ismert | .................. | F16L 55/053 138/31 |
| 6,095,195 A * | 8/2000 | Park | ...................... | F16L 55/053 138/30 |

(Continued)

FOREIGN PATENT DOCUMENTS

CN          209084273 U      7/2019

*Primary Examiner* — Patrick F Brinson
(74) *Attorney, Agent, or Firm* — INNOVATION CAPITAL LAW GROUP, LLP; Vic Lin (57) ABSTRACT

A piston-type water hammer absorber comprising: a cylinder body, a plug assembly and a piston; wherein a receiving cavity is formed in the cylinder body, and the piston is movably blocked in the receiving cavity; one end of the cylinder body is provided with a first opening and the other end is provided with a second opening, the first opening and the second opening respectively communicate with two ends of the receiving cavity, and an end of the cylinder body corresponding to the first opening is provided with a limiting part; and the plug assembly blocks the second opening, and a sealed cavity is formed between the plug assembly and the piston.

8 Claims, 5 Drawing Sheets

(56) References Cited

U.S. PATENT DOCUMENTS

| | | | | |
|---|---|---|---|---|
| 9,080,709 B2* | 7/2015 | McCoy | ............... | F16L 55/053 |
| 2015/0323115 A1* | 11/2015 | McCoy | ............... | F16L 55/053 |
| | | | | 138/31 |

* cited by examiner

PISTON-TYPE WATER HAMMER ABSORBER

BACKGROUND OF THE INVENTION

1. Technical Field

The invention belongs to the technical field of pipeline protection accessories, and relates to a piston-type water hammer absorber.

2. Description of Related Art

A piston-type water hammer absorber is generally installed in a pipeline system as a safety device specially used to absorb a "water hammer" to protect the whole pipeline system from the pressure generated by the "water hammer". The water hammer absorber has super-strong ability to absorb a water attack without stopping a water flow, so as to eliminate the noise and vibration of a pipeline, effectively absorb the water hammer, and effectively eliminate irregular surge wave oscillations caused by the water hammer and surge possibly generated by various fluids in a transmission system, thus eliminating destructive shock waves and achieving the purpose of protection.

A piston gas bag-type water hammer absorber has a closed gas chamber with a high air pressure inside and a piston at a lower end. When shock waves are introduced into the water hammer absorber, surge waves act on the piston, and the piston will move toward the gas chamber. The piston moves up and down under the dual action of gas with a certain pressure and irregular surge waves, forming a dynamic balance, thus eliminating the irregular surge wave oscillations.

For example, a Chinese patent with the publication number of CN209084273U discloses a water hammer absorber, which comprises a pipe body, wherein one end of the pipe body is a closed end, a piston is arranged in the pipe body, the other end of the pipe body is provided with a threaded connection section integrated with the pipe body, and a blocking part against which a piston may abut is arranged at an inner side of the threaded connection section of the pipe body.

Although the above-mentioned water hammer absorber may absorb the "water hammer", it is hard to assemble. Because one end of the pipe body in the above-mentioned patent is completely closed, and an opening at the other end is smaller than a diameter of the piston, the piston is very hard to install, which needs to be improved.

BRIEF SUMMARY OF THE INVENTION

The purpose of the invention is to provide a piston-type water hammer absorber aiming at the above problems existing in the prior art.

The purpose of the invention may be achieved by the following technical scheme. A piston-type water hammer absorber comprises a cylinder body, a plug assembly and a piston;

wherein a receiving cavity is formed in the cylinder body, and the piston is movably blocked in the receiving cavity;

one end of the cylinder body is provided with a first opening and the other end is provided with a second opening allowing the piston to be placed in the receiving cavity, the first opening and the second opening respectively communicate with two ends of the receiving cavity, and an end of the cylinder body corresponding to the first opening is provided with a limiting part for preventing the piston from slipping out of the first opening; and the plug assembly blocks the second opening, and a sealed cavity is formed between the plug assembly and the piston.

Preferably, the cylinder body is made of plastic.

Preferably, the plug assembly comprises a sealing plug and a pressing cap, the sealing plug blocks the second opening, and the pressing cap is connected with an end of the cylinder body corresponding to the second opening and presses the sealing plug.

Preferably, the end of the cylinder body corresponding to the second opening is provided with a first external thread, the pressing cap is provided with a first internal thread which is matched with the first external thread, and the first external thread is connected with the first internal thread.

Preferably, glue is filled between the first external thread and the first internal thread.

Preferably, two ends of the sealing plug are respectively provided with a snap-fit part and a limiting end cap, the cylinder body is provided with a snap-in recess on an inner wall corresponding to the receiving cavity, the snap-fit part is connected with the snap-in recess, and the limiting end cap abuts against an end face of the cylinder body to confine the sealing plug in the second opening.

Preferably, the snap-fit part comprises a plurality of elastic hooks arranged into an annular array, and each elastic hook snaps into the snap-in recess.

Preferably, the limiting part is formed by radially inward contraction of the end of the cylinder body corresponding to the first opening.

Preferably, the cylinder body is provided with a connecting end, the connecting end communicates with the first opening, and an outer peripheral surface of the connecting end is provided with a second external thread.

Preferably, the sealing plug is sleeved with a first sealing ring which abuts against an inner wall surface of the receiving cavity, the connecting end is sleeved with a second sealing ring, and the piston is sleeved with a third sealing ring which is in contact with the inner wall surface of the receiving cavity.

Compared with the prior art, the invention has the beneficial effects that:
1. The piston can be placed in the receiving cavity through the second opening, the limiting part can prevent the piston from sliding out of the first opening, and the plug assembly can block the second opening to allow the second opening of the cylinder body to be closed, which not only facilitate installation, but also ensure the tightness of the second opening.
2. The cylinder body is made of plastic, preferably, drinking water-grade CPVC may be used as the material of the cylinder body, so its cost is low, the processing difficulty is low as only injection molding is required, and incrustant generation is well controlled.
3. The pressing cap presses the sealing plug, so that the sealing plug may be restricted by the pressing cap, and the sealing plug is pressed into the second opening and/or the receiving cavity, so that the sealing plug is prevented from falling out of the second opening under a high pressure.
4. Because the pressing cap is also connected to an end of the second opening, the pressing cap itself also covers the second opening, so that a double sealing effect is realized through the pressing cap and the sealing plug, and in this way, a reliable closed end is formed at the second opening, the end of the cylinder body corresponding to the second opening may bear a greater pressure, and a better sealing effect may be realized.

5. When the sealing plug is inserted into the second opening, the elastic hooks arranged into an annular array extend into the receiving cavity, and each elastic hook contracts inward; and when an end of each elastic hook is inserted into the snap-in recess, the elastic hook is opened and the end of the elastic hook snaps in, so that the sealing plug is reliably fixed in the second opening, and the sealing plug is installed conveniently (as long as the sealing plug is inserted into the second opening until it snaps into the snap-in recess).

100. cylinder body; 110. receiving cavity; 111. sealed cavity; 112. snap-in recess; 120. first opening; 130. second opening; 140. limiting part; 150. first external thread; 160. connecting end; 161. second external thread; 170. second sealing ring; 200. plug assembly; 210. sealing plug; 220. first sealing ring; 230. snap-fit part; 231. elastic hook; 240. limiting end cap; 250. pressing cap; 251. first internal thread; 300. piston; 310. third sealing ring.

DETAILED DESCRIPTION OF THE INVENTION

The following are specific embodiments of the present invention and a further description of the technical scheme of the present invention with reference to the drawings, but the present invention is not limited to these embodiments.

As shown in FIGS. 1-5, a piston-type water hammer absorber comprises a cylinder body 100, a plug assembly 200 and a piston 300; wherein a receiving cavity 110 is formed in the cylinder body 100, the piston 300 is movably blocked in the receiving cavity 110, one end of the cylinder body 100 is provided with a first opening 120 and the other end is provided with a second opening 130 allowing the piston 300 to be placed in the receiving cavity 110, and the first opening 120 and the second opening 130 respectively communicate with two ends of the receiving cavity 110.

An end of the cylinder body 100 corresponding to the first opening 120 is provided with a limiting part 140 for preventing the piston 300 from slipping out of the first opening 120, the plug assembly 200 blocks the second opening 130, and a sealed cavity 111 is formed between the plug assembly 200 and the piston 300.

The two ends of the cylinder body 100 are both of open structures, that is, the two ends of the cylinder body 100 are the first opening 120 and the second opening 130 respectively, and the second opening 130 of the cylinder body 100 is blocked by the plug assembly 200 to form a closed end. During assembly, the piston 300 may be placed in the receiving cavity 110 through the second opening 130. After the piston 300 is placed in, the second opening 130 is sealed by the plug assembly 200, so that a closed end is formed at the second opening 130, which may prevent the piston 300 from separating from the cylinder body 100 through the second opening 130. The limiting part 140 is arranged at the first opening 120, and the limiting part 140 may abut against the piston 300, so that the piston 300 cannot separate from the cylinder body 100 through the first opening 120.

It should be added that the sealed cavity 111 is part of the receiving cavity 110, the sealed cavity 111 is filled with high-pressure gas, which may push the piston 300 to the first opening 120, and the limiting part 140 abuts against the piston 300 to prevent the piston 300 from being pushed out of the first opening 120 by the high-pressure gas.

The first opening 120 is kept open so that the cylinder body 100 can communicate with an external waterway system, the piston 300 is blocked in the receiving cavity 110, one side of the piston 300 is provided with the sealed cavity 111, and the other side of the piston 300 communicates with the first opening 120, so the impact and vibration generated by the water hammer can be transmitted into the receiving cavity 110 through the first opening 120 and act on the piston 300. The sealed cavity 111 is hermetically isolated from the first opening 120 by the piston 300, and the sealed cavity 111 abuts against the piston 300 through high-pressure air.

Surge waves enter the receiving cavity 110 of the cylinder body 100 through the first opening 120 and act on the piston 300, and the piston 300 will move toward the second opening 130, so the piston 300 moves up and down under the dual action of the gas with a certain pressure and the irregular surge waves to form a dynamic balance, thus eliminating irregular surge wave oscillations. During working, the piston 300 is held through the high-pressure gas in the sealed cavity 111, so that the surge waves are absorbed, allowing the piston 300 to eliminate the noise and vibration of a pipeline, effectively absorb the water hammer, and effectively eliminate irregular surge wave oscillations caused by the water hammer and surge possibly generated by various fluids in a transmission system, so as to eliminate destructive shock waves and achieve the purpose of protection.

Therefore, the piston-type water hammer absorber mentioned above can be installed conveniently on the premise of realizing the absorption of the water hammer and protecting the pipeline system. After assembly, the overall structural strength is very high, the piston 300 can be placed in the receiving cavity 110 through the second opening 130, the limiting part 140 can prevent the piston 300 from sliding out of the first opening 120, and the plug assembly 200 can block the second opening 130 so as to form a closed end at the second opening of the cylinder body 100. In this way, installation is facilitated, and the tightness of the second opening 130 is guaranteed.

Figure 1:
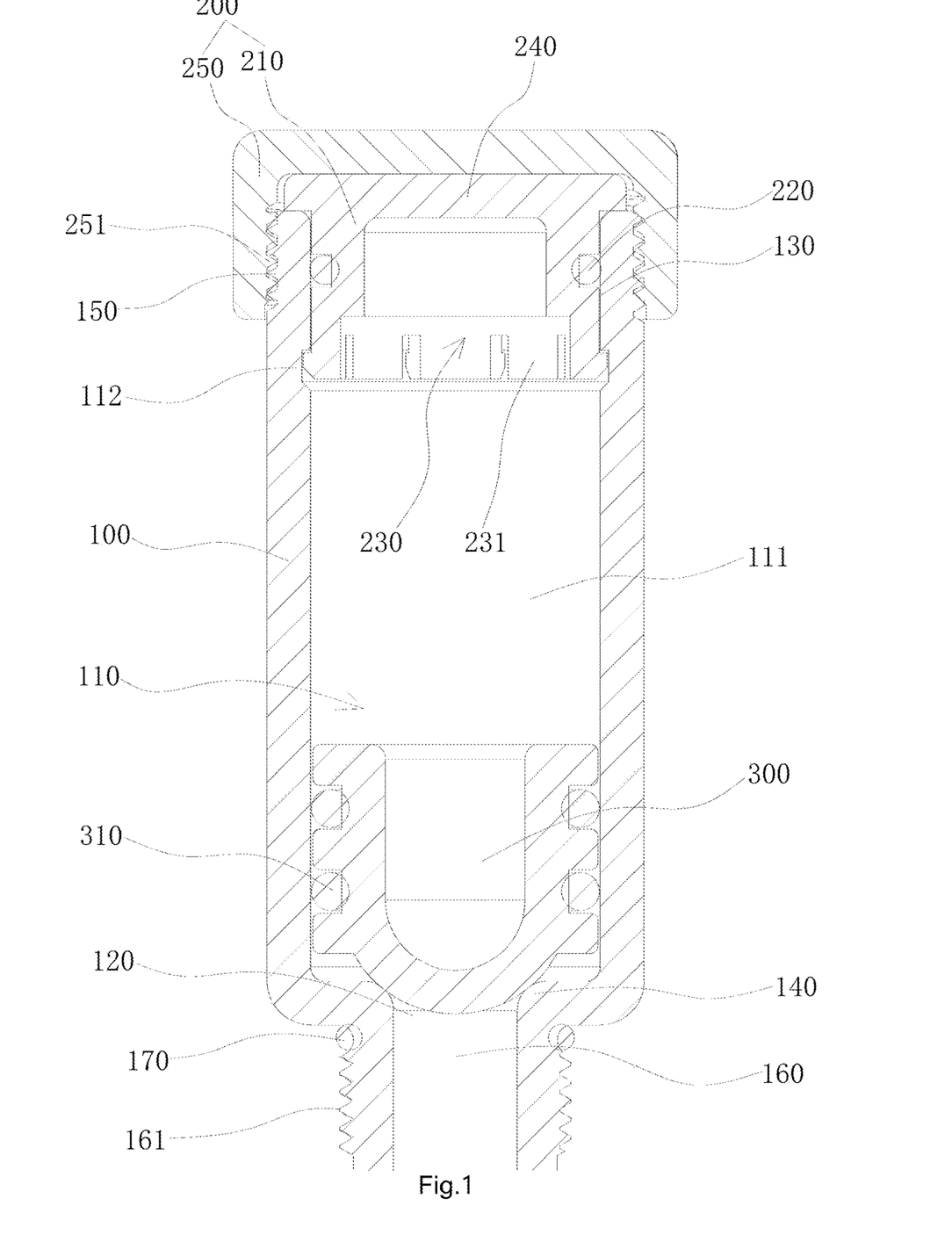
FIG. 1 is a schematic diagram of a connection relationship of a piston-type water hammer absorber of the invention.
Figure 5:
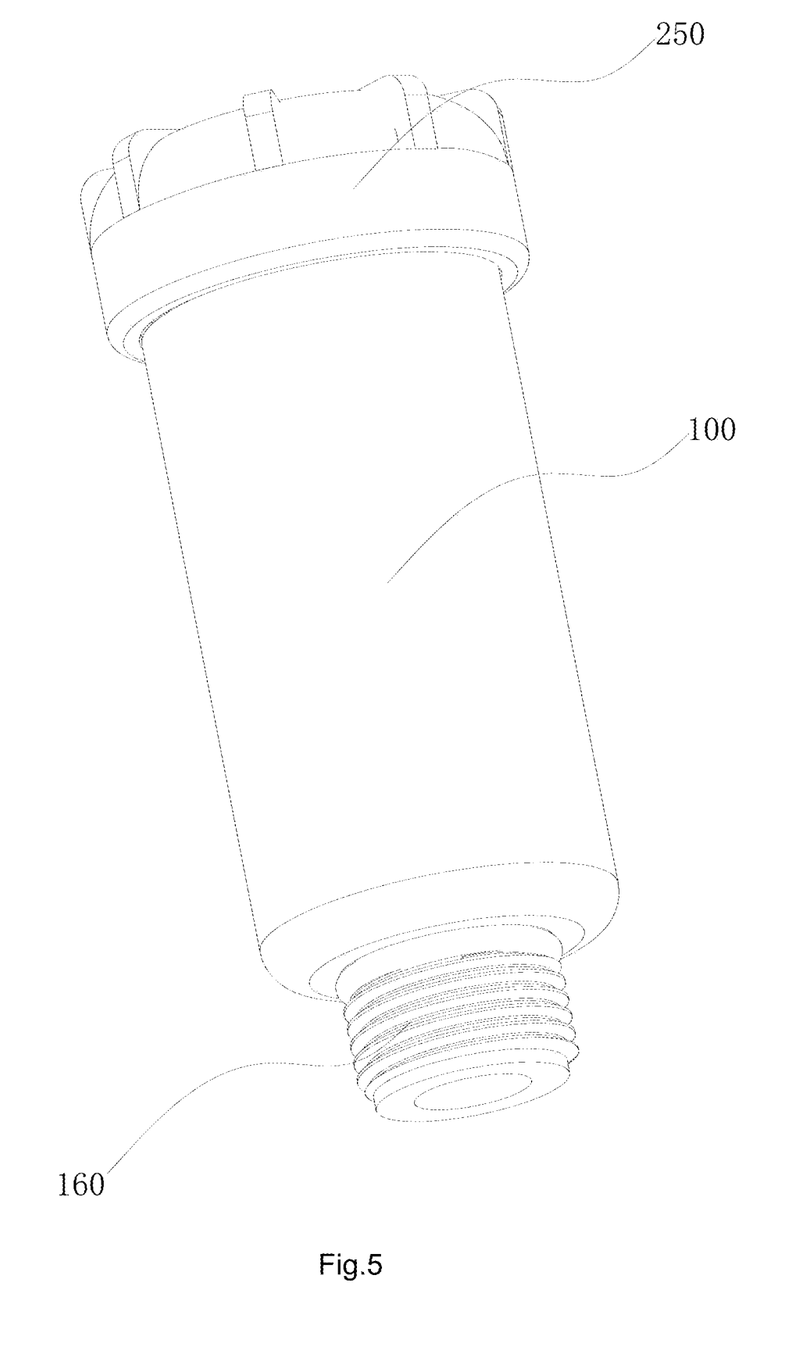
FIG. 5 is a schematic diagram of a piston-type water hammer absorber of the invention.

As shown in FIGS. 1 and 5, on the basis of the above embodiment, the cylinder body 100 is a plastic part. It should be pointed out that existing piston-type water hammer absorbers are generally made of red copper or steel, which tends to generate incrustants. Besides, red copper and stainless steel are high in cost and hard to process.

In this embodiment, the cylinder body 100 is made of plastic. Specifically, the cylinder body 100 uses drinking water-grade CPVC as the material of the cavities and accessories, so its cost is low, the processing difficulty is low as only injection molding is required, and incrustant generation is well controlled.

As shown in FIG. 1-4, on the basis of the above embodiment, the plug assembly 200 comprises a sealing plug 210 and a pressing cap 250, the sealing plug 210 blocks the second opening 130, and the pressing cap 250 is connected with an end of the cylinder body 100 corresponding to the second opening 130 and presses the sealing plug 210.

Preferably, the sealing plug 210 may be blocked at a transition position between the receiving cavity 110 and the second opening 130, or in the second opening 130, and the pressing cap 250 presses the sealing plug 210, so that the sealing plug 210 can be restrained by the pressing cap 250 and pressed in the second opening 130 and/or the receiving cavity 110, thus preventing the sealing plug 210 from falling out of the second opening 130 under a high pressure.

In addition, because the pressing cap 250 is also connected to an end of the second opening 130, the pressing cap 250 itself also covers the second opening 130, so that a double sealing effect is realized through the pressing cap 250 and the sealing plug 210, and in this way, a reliable closed end is formed at the second opening 130, the end of the cylinder body 100 corresponding to the second opening 130 may bear a greater pressure, and a better sealing effect may be realized.

Figure 2:
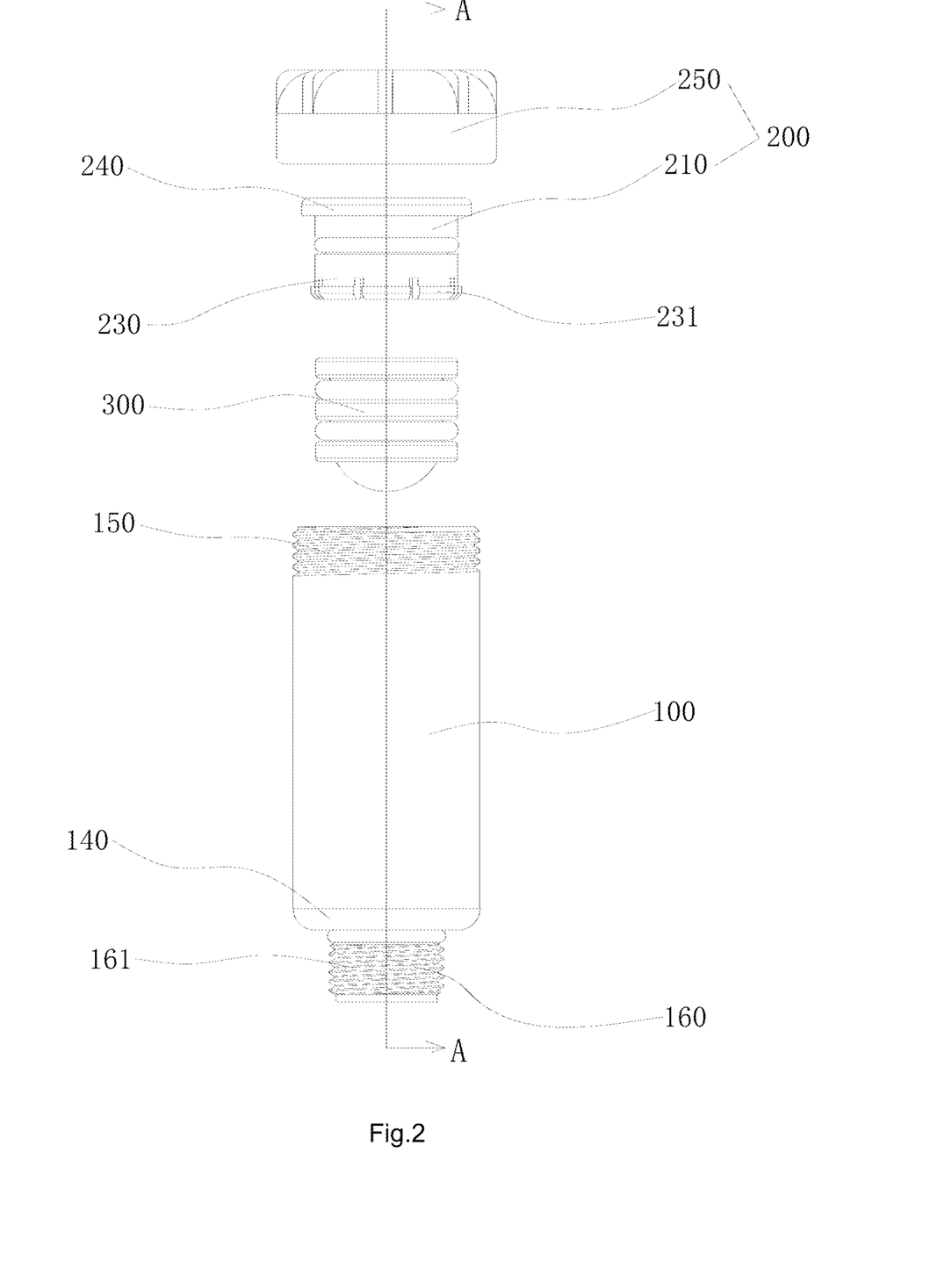
FIG. 2 is an exploded view of a piston-type water hammer absorber of the invention.
Figure 3:
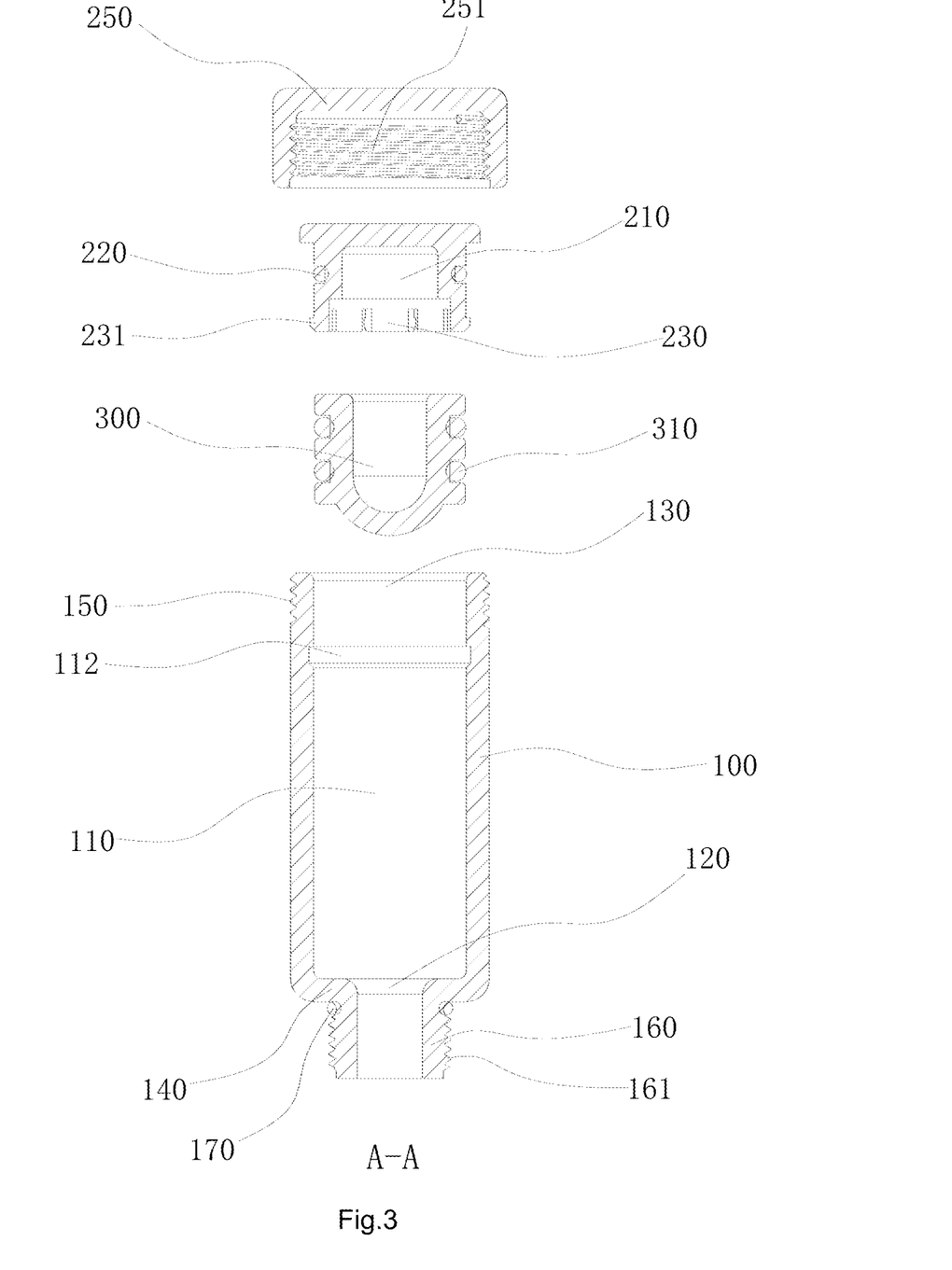
FIG. 3 is a schematic diagram of a section A-A in FIG. 2.

As shown in FIGS. 1-3, on the basis of the above embodiment, the end of the cylinder body 100 corresponding to the second opening 130 is provided with a first external thread 150, the pressing cap 250 is provided with a first internal thread 251 which is matched with the first external thread 150, and the first external thread 150 is connected with the first internal thread 251. Glue is filled between the first external thread 150 and the first internal thread 251.

Preferably, the pressing cap 250 is in threaded connection with one end of the cylinder body 100 corresponding to the second opening 130 by special glue, thus realizing double sealing and permanent fixation, further improving the reliability of connection between the pressing cap 250 and the cylinder body 100, enabling the end of the cylinder body 100 to bear a greater pressure after the closed end is formed through the plug assembly 200, and enabling the sealing effect of the closed end of the cylinder body 100 to be better.

As shown in FIGS. 1-4, on the basis of the above embodiment, two ends of the sealing plug 210 are respectively provided with a snap-fit part 230 and a limiting end cap 240, the cylinder body 100 is provided with a snap-in recess 112 on an inner wall corresponding to the receiving cavity 110, the snap-fit part 230 is connected with the snap-in recess 112, and the limiting end cap 240 abuts against an end face of the cylinder body 100 to confine the sealing plug 210 in the second opening 130.

Preferably, the sealing plug 210 is fixed in the second opening 130 and cannot move. The sealing plug 210 is of a cap-like structure, which is inserted into the receiving cavity 110 through the second opening 130, and the limiting end cap 240 abuts against the end face of the cylinder body 100 so that the sealing plug 210 is held and can not be inserted into the receiving cavity 110 any more. The snap-fit part 230 snaps into the snap-in recess 112 so that the sealing plug 210 cannot be pulled out of the second opening 130. In this way, the sealing plug 210 is reliably locked in the second opening 130 by the structure of the snap-fit part 230 and the limiting end cap 240.

Figure 4:
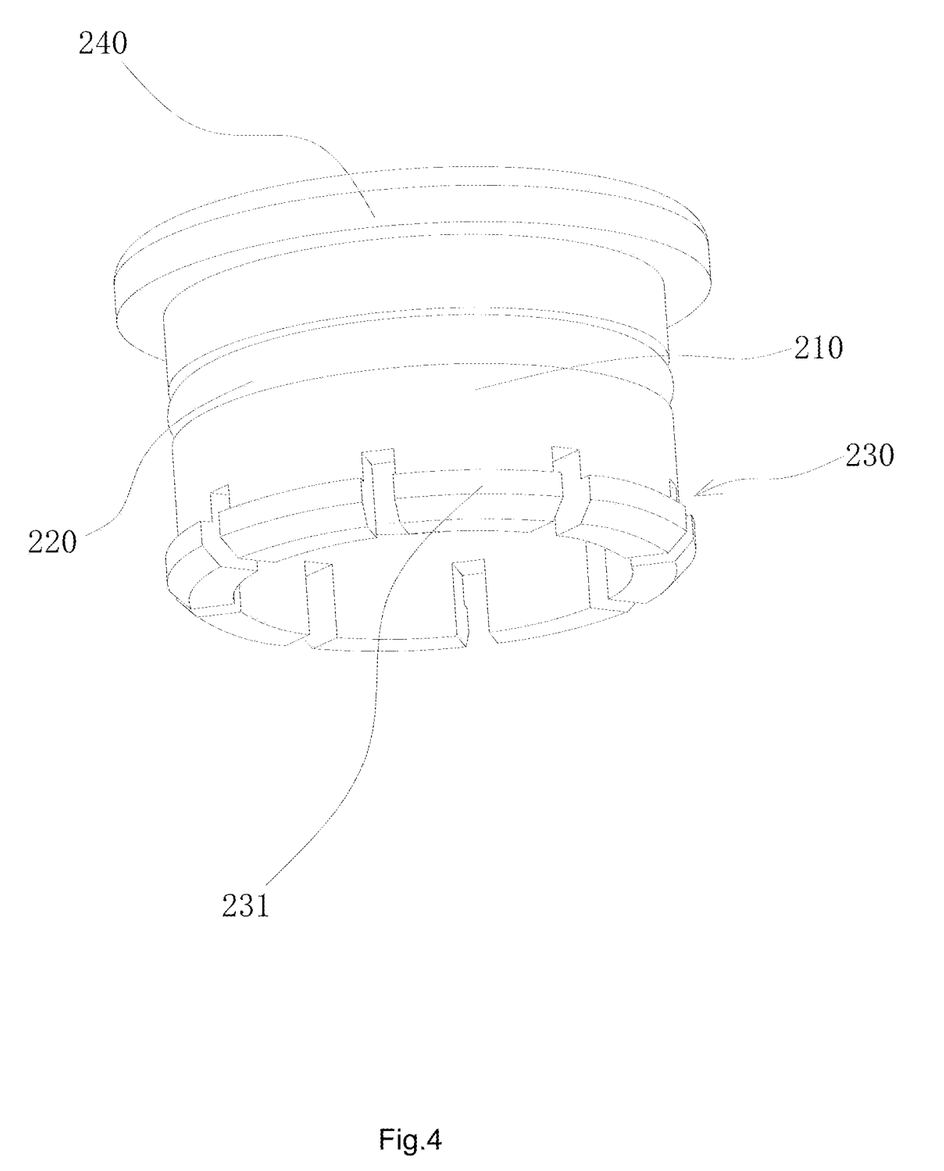
FIG. 4 is a structural diagram of a sealing plug of the invention.

As shown in FIGS. 1, 3 and 4, on the basis of the above embodiment, the snap-fit part 230 comprises a plurality of elastic hooks 231 arranged into an annular array and extending into the receiving cavity 110, and each elastic hook 231 snaps into the snap-in recess 112.

Preferably, when the sealing plug 210 is inserted into the second opening 130, the elastic hooks 231 arranged into an annular array extend into the receiving cavity 110, and each elastic hook 231 contracts inward; and when an end of each elastic hook 231 is inserted into the snap-in recess 112, the elastic hook 231 is opened and the end of the elastic hook 231 snaps in, so that the sealing plug 210 is reliably fixed in the second opening 130, and the sealing plug 210 is installed conveniently (as long as the sealing plug 210 is inserted into the second opening 130 until it snaps into the snap-in recess 112).

It should be pointed out here that the piston-type water hammer absorber is made of plastic parts, and multiple double sealing and locking structures are adopted in product design, so that problems caused by incrustants and metal corrosion can be avoided on the premise of ensuring better strength.

As shown in FIGS. 1-4, based on the above embodiment, the limiting part 140 is formed by radially inward contraction of the end of the cylinder body 100 corresponding to the first opening 120.

Preferably, the limiting part 140 is actually a shoulder structure of the cylinder body 100. Simply put, the limiting part 140 is a necking structure, that is, one end of the cylinder body 100 corresponding to the first opening 120 contracts inward to form the limiting part 140 with a reduced diameter.

As shown in FIGS. 1-3, based on the above embodiment, the cylinder body 100 is provided with a connecting end 160 which communicates with the first opening 120, and an outer peripheral surface of the connecting end 160 is provided with a second external thread 161. The second external thread 161 is used for quick and safe connection with various accessories and valve bodies to enable installation and use of various pipelines.

As shown in FIGS. 1, 3 and 4, on the basis of the above embodiment, the sealing plug 210 is sleeved with a first sealing ring 220 which abuts against an inner wall surface of the receiving cavity 110, the connecting end 160 is sleeved with a second sealing ring 170, and the piston 300 is sleeved with a third sealing ring 310 which is in contact with the inner wall surface of the receiving cavity 110.

Preferably, the first sealing ring 220 is used to seal a gap between an inner wall of the receiving cavity 110 and the sealing plug 210, so that the sealing plug 210, together with the first sealing ring 220, can seal the second opening 130. A connecting area between the connecting end 160 and various accessories and valve bodies may be sealed through the second sealing ring 170. The piston 300, together with the third sealing ring 310, may keep the sealed cavity 111 hermetically isolated from the first opening 120.

It should be added that the number of the first sealing rings 220, the number of the second sealing rings 170 and the number of the third sealing rings 310 may be set to be one or two or more, and the specific number depends on actual needs.

It should be noted that all directional indications (such as up, down, left, right, front, back, . . . ) in the embodiment of the invention are only used to explain the relative positional relationship, movement situation, etc., among components in a certain posture (as shown in the drawings), and if the specific posture changes, the directional indication will change accordingly.

In addition, in the invention, descriptions such as "first", "second" and "one" are only used for descriptive purposes, and cannot be understood as indicating or implying their relative importance or implicitly indicating the number of indicated technical features. Therefore, the features defined with "first" and "second" can explicitly or implicitly include at least one of the features. In the description of the invention, "a plurality of" means at least two, such as two, three, etc., unless otherwise explicitly and specifically limited.

In the invention, unless otherwise specified and limited, the terms "connect" and "fix" should be broadly understood, for example, "fix" may be fixed connection, detachable connection or integration; may be mechanical connection or electrical connection; may be direct connection or indirect connection through an intermediate medium; and may be internal communication of two elements or interaction between two elements, unless otherwise explicitly limited. For those of ordinary skill in the art, the specific meanings of the above terms in the invention may be understood according to specific situations.

In addition, the technical schemes of various embodiments of the invention can be combined, on the premise that it can be realized by those of ordinary skill in the art. When the combination of technical schemes is contradictory or infeasible, it should be considered that such combination of technical schemes does not exist and is not within the scope of protection required by the invention.

What is claimed is:

1. A piston-type water hammer absorber, comprising: a cylinder body, a plug assembly and a piston;
    wherein a receiving cavity is formed in the cylinder body, and the piston is movably blocked in the receiving cavity;
    one end of the cylinder body is provided with a first opening and the other end is provided with a second opening allowing the piston to be placed in the receiving cavity, the first opening and the second opening respectively communicate with two ends of the receiving cavity, and an end of the cylinder body corresponding to the first opening is provided with a limiting part for preventing the piston from slipping out of the first opening; and
    the plug assembly blocks the second opening, and a sealed cavity is formed between the plug assembly and the piston;
    the plug assembly comprises a sealing plug and a pressing cap, the sealing plug blocks the second opening, and the pressing cap is connected with an end of the cylinder body corresponding to the second opening and presses the sealing plug;
    two ends of the sealing plug are respectively provided with a snap-fit part and a limiting end cap, the cylinder body is provided with a snap-in recess on an inner wall corresponding to the receiving cavity, the each snap-fit part is connected with the snap-in recess, and the limiting end cap abuts against an end face of the cylinder body to confine the sealing plug in the second opening.

2. The piston-type water hammer absorber according to claim 1, wherein the cylinder body is made of plastic.

3. The piston-type water hammer absorber according to claim 1, wherein the end of the cylinder body corresponding to the second opening is provided with a first external thread, the pressing cap is provided with a first internal thread which is matched with the first external thread, and the first external thread is connected with the first internal thread.

4. The piston-type water hammer absorber according to claim 3, wherein glue is filled between the first external thread and the first internal thread.

5. The piston-type water hammer absorber according to claim 1, wherein the snap-fit part comprises a plurality of elastic hooks arranged into an annular array, and each elastic hook snaps into the snap-in recess.

6. The piston-type water hammer absorber according to claim 1, wherein the limiting part is formed by radially inward contraction of the end of the cylinder body corresponding to the first opening.

7. The piston-type water hammer absorber according to claim 1, wherein the cylinder body is provided with a connecting end, the connecting end communicates with the first opening, and an outer peripheral surface of the connecting end is provided with a second external thread.

8. The piston-type water hammer absorber according to claim 7, wherein the sealing plug is sleeved with a first sealing ring which abuts against an inner wall surface of the receiving cavity, the connecting end is sleeved with a second sealing ring, and the piston is sleeved with a third sealing ring which is in contact with the inner wall surface of the receiving cavity.

* * * * *